INVENTOR.
WILLIAM E. McCOWN
BY
ATTORNEY

Patented June 14, 1949

2,473,344

UNITED STATES PATENT OFFICE 2,473,344

OVERLOAD PROTECTION SYSTEM

William E. McCown, Gloucester, N. J., assignor to Radio Corporation of America, a corporation of Delaware Application January 26, 1945, Serial No. 574,696

3 Claims. (Cl. 175—363)

This invention relates to the protection of electrical circuits against overload and has particular reference to systems in which the circuit to be protected is de-energized by the overload, is automatically re-energized after a predetermined delay, and is then re-presented to the protective device to determine whether the circuit is still overloaded.

Prior art protective devices employing mechanical relays for this purpose are expensive and erratic in operation. In a common application the circuit to be protected is de-energized in response to the overload, is re-energized after a delay of, say, two-tenths of a second, and is then again de-energized if the overload is still present. Overload relays now in use have been found to be subject to wide variations in delay if the operation is repeated at too high a rate. In a system of this kind it is frequently desired, if more than a given number of overloads occur in a definite period, to lock out the overloaded circuit completely until the cause of the overload can be ascertained and removed; and when mechanical relays have been used for this purpose there have been wide variations in the number of overloads which occur before the overloaded circuit is locked out. It is also sometimes desired to provide overload protection for apparatus, different circuits of which carry direct and alternating current, respectively.

One of the objects of the invention, therefore, is to provide an overload protection system which will not be subject to wide variations in delay.

Another object of the invention is to provide a reliable overload protection system in which the protected circuit shall be opened by the overload, reclosed after a given time delay, and re-presented to the protective system to determine whether the overload has been removed during the delay.

A further object of the invention is to provide an improved system which will lock out the overloaded circuit if it is subject to more than a predetermined number of overloads in a given period.

An additional object is the provision of a single system for the protection against overload of a direct current circuit and for an alternating current circuit which controls the direct current circuit.

It is a further object of the invention to provide a simple, compact, inexpensive and accurate system of overload protection for different circuits carrying alternating and direct current, respectively, said system exhibiting the features of time delay reclosing and recycling of the overloaded circuit and also of lock-out of the overloaded circuit if more than a given number of overloads occur in a predetermined period.

According to one embodiment of the invention, all of the before-mentioned objects are achieved by permitting direct current to flow in a circuit to be protected in response only to the flow of space current in a gas tube, the protected circuit being connected to extinguish the space current of the gas tube on the occurrence of an overload. A capacitor forming part of a time delay combination is charged by the overload and the discharge of this capacitor is caused to re-ignite the tube and thus to re-establish current in the protected circuit. A second gas tube is so connected as to be biased below ignition level by the space current of the first tube, but is ignited on the occurrence of a given number of overloads in a predetermined time. This, in turn, is caused to lock out the protected circuit. A relay inserted in a circuit carrying alternating current, and cooperating with appropriate contacts in the space current path of the first tube, is caused to extinguish that tube upon the occurrence of an overload in the alternating current circuit, and to set in motion a series of operations similar to that caused by direct current overload.

The before-mentioned embodiment will now be described in greater detail with reference to the accompanying drawing in which:

Figure 1 is a circuit diagram of the embodiment referred to, and

The invention finds particular, though by no means exclusive, application in the protection against overload of the various circuits of a radio communication transmitter. In such a transmitter there are various circuits in the power supply and in the transmitter proper which carry direct current, and also circuits (for example, in the input to the power supply) which carry alternating current. An overload of a circuit which carries current of one type will not necessarily be reflected in a circuit of another type and it is, accordingly, desirable to provide independent overload protection for the direct current and alternating current circuits.

Figure 1:
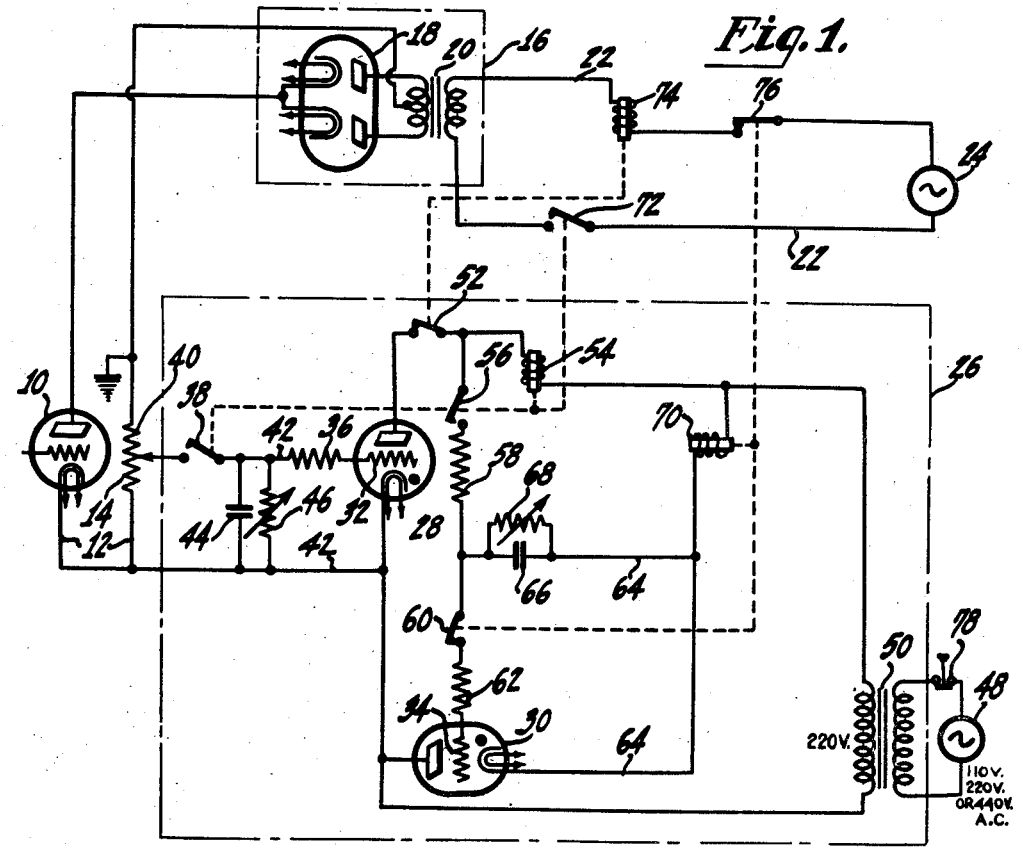

In Fig. 1 there is indicated a tube 10 which may be any tube, say, of a transmitter. The tube has a cathode circuit 12 including a cathode resistor 14. Voltage for the anode of this tube is obtained from a power supply 16 which includes a rectifier 18 and transformer 20. The power supply is connected by an input circuit 22 to a source 24 of alternating voltage. The cathode circuit 12 may be taken as an example of a direct current circuit for which overload protection is to be provided, and the input circuit 22 as an alternating current circuit which is to be similarly protected.

The protective device of the invention, shown enclosed within the broken rectangular line 26, consists essentially of two gas tubes 28 and 30 and of their associated circuits. The tubes are referred to as a "relay tube" and a "lock-out tube," respectively. The tubes each have at least one control electrode 32 and 34, respectively, and may be triodes (for example, of RCA type 884) or tetrodes (for example, of RCA type 2050). The anode of each tube is connected to the cathode of the other, and both tubes are operated by alternating voltage applied between their anode and cathode from a source 48 through a transformer 50. The control electrode 32 is connected through a grid-current-limiting resistor 36 and a pair of normally open contacts 38 to an adjustable tap 40 on the cathode resistor 14 of the direct current circuit to be protected. The grid circuit 42 of the relay tube 28 includes a time delay combination consisting of a capacitor 44 and variable resistor 46. The anode circuit of the same tube includes a pair of normally closed contacts 52 and the energizing winding of a relay 54.

The anode of the relay tube is connected to the control electrode of the lock-out tube 30 by the following elements in the order named: A pair of normally open contacts 56, a resistor 58, a pair of normally closed contacts 60 and a grid-current-limiting resistor 62. The grid circuit 64 of the lock-out tube includes a time delay combination consisting of a capacitor 66 and a variable resistor 68, and its anode-to-cathode circuit includes the energizing winding of a relay 70 connected to open a pair of normally closed contacts 76 in the alternating current circuit 22. This circuit 22 also includes a pair of normally open contacts 72 and the energizing winding of a relay 74 connected to open the normally closed contacts 52 in the anode circuit of the relay tube when alternating current in excess of a predetermined value flows in that winding. The relay 54 is connected to all three sets of normally open contacts 38, 56 and 72 and is designed to close them when current flows in its energizing winding.

The operation of the embodiment described is as follows:

On the application of alternating voltage from the source 48 between the anodes and cathodes of tubes 28 and 30, the former of these two tubes conducts. Space current of this tube 28 flows in the energizing winding of relay 54 closing contacts 72, 56 and 38. This, in turn, closes circuit 22 enabling anode voltage to be applied to tube 10 and current to flow in the cathode circuit 12. Space current of the relay tube creates a potential drop across the energizing winding of relay 54. Since contacts 56 and 60 are closed, this places a negative bias on control electrode 34 sufficient to prevent tube 30 from conducting. This is the normal condition of the device in the absence of an overload of circuits 12 and 22; tube 28 conducts and tube 30 does not.

If an overload occurs in direct current circuit 12, voltage across resistor 14 increases. This places a negative bias on control electrode 32 (since contacts 38 are closed), extinguishes tube 28, de-energizes relay 54, and opens contacts 38, 56 and 72, and, therefore, the circuit 22, thus removing power from the tube 10 and, therefore, de-energizing circuit 12. The overload also places a charge on capacitor 44; on the opening of contacts 38 this charge leaks off through resistor 46 and increases the voltage of control electrode 32 sufficiently to re-ignite tube 28, thereby re-closing circuits 22 and 12.

The period between the de-energizing and re-energizing of circuits 22 and 12 (that is, between the extinction and re-ignition of tube 28) is determined by the time constant of the capacitor-resistor combination 44, 46. In one practical application, the capacitor 44 had a value of one-half microfarad and the resistor 46 a maximum value of one megohm, thus creating a delay in practice of from one- to five-tenths second.

An overload will frequently be due to some temporary cause and, therefore, corrects itself during the period of delay created as described. The operation of the transmitter or other apparatus will thus be resumed with a minimum of delay. If the cause of the overload is not removed, the tube 28 will be extinguished and the circuits 22 and 12 de-energized with each successive application of voltage from the overloaded circuit 12 to the control electrode 32. However, the operation of tube 30, which is now to be considered, prevents the continuance of the successive re-energization of circuits 22 and 12.

Figure 2:
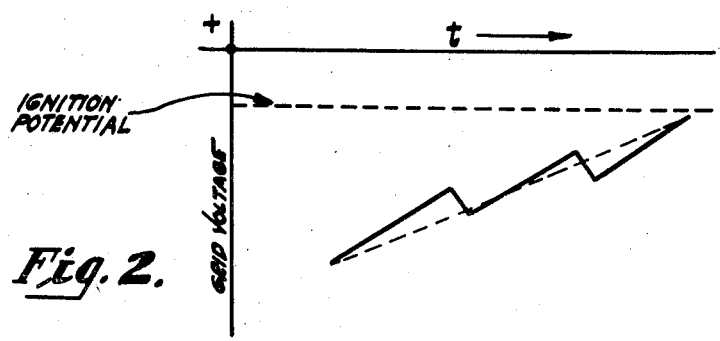
Figure 2 is a graph illustrating the operation of a portion of the device.

It has already been mentioned that space current of tube 28 places a negative bias on control electrode 34. It also charges capacitor 66. Upon each successive extinction of tube 28, the charge on this capacitor leaks off through resistor 68, increasing the voltage of electrode 34. The effect of the successive extinction and re-ignition of tube 28 upon the grid voltage of tube 30 is best seen from a consideration of the solid curve of Fig. 2; the upward strokes of this curve represent the increase of grid voltage of tube 30 when tube 28 is extinguished and capacitor 66 is discharged, and the downward strokes represent the decrease of grid voltage when tube 28 conducts. If circuit 12 continues overloaded, tube 28 will conduct for very brief periods, and the grid voltage of tube 30 will soon reach ignition level (the horizontal broken line of Fig. 2) causing tube 30 to conduct. Appropriate values are chosen for the time delay combination constituted by capacitor 66, resistor 68 and to some extent resistor 58, to ignite tube 30 upon the occurrence within a given period of a given number of overloads in circuit 12. The time rate of the occurrence of overloads in circuit 12 is the rate at which tube 28 is extinguished and re-ignited, and is also the rate at which the voltage of electrode 34 increases with respect to time. This rate is represented by the slope of the resultant curve of Fig. 2, which is shown as a dotted line joining the beginning and end of the solid curve of Fig. 2. In one practical application, capacitor 66 had a value of one-tenth microfarad, resistor 68 a maximum value of two megohms and resistor 58 a value of three megohms. This caused ignition of tube 30 if three overloads occurred in circuit 12 within a period of fifteen seconds.

When tube 30 conducts, relay 70 is energized by space current of the tube and opens contacts 76 and 60. The former of these contacts opens circuit 22, thus removing current from circuit 12. The opening of contacts 60 isolates the control electrode 34, thus insuring that tube 30 continues to conduct. The protected circuit, therefore, remains locked out until the operator can ascertain and remove the cause of the overload, and then reclose the circuit by a push button 78 or other appropriate means.

If an overload occurs in circuit 22, relay 74 is energized and opens contacts 52. Tube 28 is extinguished by the opening of its anode circuit, relay 54 is de-energized and contacts 72 are opened, opening circuit 22. Relay 74 is, therefore, de-energized, closing contacts 52 and re-establishing space current of the relay tube, which re-energizes relay 54 and closes contacts 72. The process will be repeated as long as circuit 22 remains overloaded.

There has thus been described a method of and means for the protection against overload of a circuit carrying direct current and of a controlling alternating current circuit therefor. The overload in the direct current circuit extinguishes a gas tube and opens the alternating current circuit. The gas tube is automatically re-ignited after a predetermined period and closes the alternating current circuit, re-establishing current in the direct current circuit. The occurrence of a predetermined number of overloads in a given time ignites a second gas tube which, in turn, locks out the alternating current circuit. Finally, an overload in the alternating current circuit is also caused to extinguish the first gas tube and thus to open the overloaded circuit.

I claim as my invention:

1. In an overload protection system, a controlling circuit including a gas discharge relay tube and a gas discharge lock-out tube, means for supplying alternating current to said relay tube, a controlled circuit including a direct current portion and an alternating current portion, said controlled circuit being energized only when said relay tube is energized, means responsive to the flow of space current in said relay tube for closing said alternating current portion and for normally preventing ignition of said lock-out tube, means responsive to an overload in said direct current portion for extinguishing said relay tube and for re-ignition thereof after a predetermined period, means responsive to an overload in said alternating current portion for extinguishing said relay tube and for thereupon re-igniting the same, means responsive to a predetermined rate of extinction and re-ignition of said relay tube for igniting said lock-out tube, and means responsive to the flow of space current in said lock-out tube for keeping said alternating current portion open.

2. In an overload protection system, a controlling circuit comprising the combination of biased open and biased closed contacts, a first and a second gas discharge tube, means for supplying alternating current to said first tube, each of said tubes having at least one control electrode in addition to a cathode and an anode, each of said tubes having a control electrode circuit connecting the control electrode of each tube with its cathode, a circuit including biased open and biased closed contacts connecting the anode of said first tube to the control electrode of the second tube, a controlled circuit energized only when said first tube is ignited, an input circuit including biased open contacts for applying voltage derived from said controlled circuit to the control electrode of said first tube, time delay combinations in the control electrode circuits of each of said two gas tubes, a relay adapted to be energized by space current of said first tube to close the biased open contacts of the controlling circuit, of the input circuit and of the circuit connecting the two gas tubes, and a second relay adapted to be energized by space current of the second tube to open the biased closed contacts of the controlling circuit and of the circuit connecting the two gas tubes.

3. A system according to claim 2, characterized by the addition of biased closed contacts in the space current path of the first tube and by a third relay for opening said contacts, said relay being adapted to be energized by current of said controlling circuit in excess of a predetermined value.

WILLIAM E. McCOWN.

REFERENCES CITED

The following references are of record in the file of this patent:

UNITED STATES PATENTS

| Number | Name | Date |
|---|---|---|
| 508,652 | Thomson | Nov. 14, 1893 |
| 1,737,649 | Edsall | Dec. 3, 1929 |
| 1,773,356 | Frost et al. | Aug. 19, 1930 |
| 1,825,015 | Raney | Sept. 29, 1931 |
| 1,874,840 | Williamson | Aug. 30, 1932 |
| 1,944,072 | Fitzgerald | Jan. 16, 1934 |
| 2,071,860 | Stoddard | Feb. 23, 1937 |
| 2,130,429 | Kingdon | Sept. 20, 1938 |
| 2,142,546 | Winograd | Jan. 3, 1939 |